(12) United States Patent
Cruzado Parla et al.

(10) Patent No.: US 9,914,270 B2
(45) Date of Patent: Mar. 13, 2018

(54) DEVICE AND METHOD OF MANUFACTURING OMEGA STRINGERS

(71) Applicant: AIRBUS OPERATIONS S.L., Madrid (ES)

(72) Inventors: Gabriel Cruzado Parla, Madrid (ES); Alberto Martinez Cerezo, Madrid (ES); Jorge Galiana Blanco, Madrid (ES); Jose Cuenca Rincon, Madrid (ES); Aquilino Garcia Garcia, Madrid (ES); Augusto Perez Pastor, Madrid (ES)

(73) Assignee: AIRBUS OPERATIONS S.L., Madrid (ES)

( * ) Notice: Subject to any disclaimer, the term of this patent is extended or adjusted under 35 U.S.C. 154(b) by 572 days.

(21) Appl. No.: 14/526,824

(22) Filed: Oct. 29, 2014

(65) Prior Publication Data

US 2015/0118345 A1    Apr. 30, 2015

(30) Foreign Application Priority Data

Oct. 30, 2013    (EP) .................................... 13382435

(51) Int. Cl.
*B29C 43/32*    (2006.01)
*B29C 70/46*    (2006.01)
(Continued)

(52) U.S. Cl.
CPC .......... *B29C 70/462* (2013.01); *B29C 70/543* (2013.01); *B29D 99/0003* (2013.01);
(Continued)

(58) Field of Classification Search
CPC ... B29C 70/543; B29C 70/462; B29C 33/202; B29D 99/0003; Y02T 50/433;
(Continued)

(56) References Cited

U.S. PATENT DOCUMENTS 4,726,924 A * 2/1988 Mittelstadt .............. B29B 15/08
                                                  264/257
6,745,609 B2 * 6/2004 Garnett .................. B21D 22/26
                                                  72/347
(Continued)

FOREIGN PATENT DOCUMENTS

EP          2014437 A1     1/2009
WO     2012062828 A        5/2012

OTHER PUBLICATIONS

European Patent Office, Extended European Search Report for European Patent Application No. 13382435, dated Apr. 17, 2014.

*Primary Examiner* — Joseph S Del Sole
*Assistant Examiner* — Thukhanh T Nguyen
(74) *Attorney, Agent, or Firm* — Lorenz & Kopf, LLP (57) ABSTRACT

An apparatus for manufacturing composite stringers from a composite laminate comprising a male mold, a main caul plate, two fixed female mold halves, two secondary movable caul plates and a retention device. The main caul plate is located below the male mold, the female mold halves are located at both sides of the main caul plate and the secondary movable caul plates, each of them located respectively over each one of the two female mold halves. The male mold, the main caul plate, the two female mold halves and the two secondary caul plates are non-developable surfaces. The retention device keeps each secondary movable caul plate at a predetermined distance of its respective female mold half.

19 Claims, 7 Drawing Sheets

(51) Int. Cl.
  *B29C 70/54* (2006.01)
  *B64C 1/06* (2006.01)
  *B29D 99/00* (2010.01)
  *B29K 105/08* (2006.01)
  *B29L 9/00* (2006.01)
  *B29L 31/30* (2006.01)
  *B29L 31/00* (2006.01)
  *B29C 33/20* (2006.01)
  *B64C 1/00* (2006.01)

(52) U.S. Cl.
  CPC ............ *B64C 1/064* (2013.01); *B29C 33/202* (2013.01); *B29K 2105/0872* (2013.01); *B29L 2009/00* (2013.01); *B29L 2031/001* (2013.01); *B29L 2031/3076* (2013.01); *B29L 2031/3082* (2013.01); *B64C 2001/0072* (2013.01); *Y02T 50/433* (2013.01)

(58) Field of Classification Search
  CPC ......... B29K 2105/0872; B29L 2009/00; B29L 2031/3076; B29L 2031/001; B29L 2031/3082; B64C 2001/0072; B64C 1/064
  USPC ................................ 425/385, 395, 398, 412
  See application file for complete search history.

(56) References Cited

U.S. PATENT DOCUMENTS

| | | | |
|---|---|---|---|
| 7,527,759 B2* | 5/2009 | Lee ....................... | B29C 33/307 264/239 |
| 8,557,165 B2* | 10/2013 | Jones .................... | B29C 33/307 425/394 |
| 2006/0231981 A1 | 10/2006 | Lee et al. | |
| 2010/0181017 A1* | 7/2010 | Shinoda .................. | B29C 33/04 156/242 |
| 2011/0291325 A1 | 12/2011 | Mattia | |

* cited by examiner

DEVICE AND METHOD OF MANUFACTURING OMEGA STRINGERS

CROSS-REFERENCE TO RELATED APPLICATION

This application claims priority to European Patent Application No. 13 382 435.9, filed Oct. 30, 2013, which is incorporated herein by reference in its entirety.

TECHNICAL FIELD

This application pertains to the field of aircraft structures and, more particularly, to the field of manufacturing composite aircraft stringers, especially omega composite stringers with particular shapes, such as including torsion, changes in thickness, and changes in the longitudinal deflection of the omega section.

BACKGROUND

Aeronautic structures are designed in an optimal way to minimize weight and maximize strength. This way usually involves the use of a skin reinforced by some stiffening elements. Therefore, in the case of a fuselage, it is very common to have the skin stiffened by frames and stringers. The use of composite materials in the manufacturing of these elements is increasing, because of their better mechanical properties and their lower weight. Nevertheless, the manufacturing of complex elements, such as stringers that may change their size and thickness, their curvature and/or orientation, entail several drawbacks, as these changes are not easily followed by the traditional mould-and-plate machines.

The state of the art comprises several methods of manufacturing straight stringers, such as those described in US Pub. No. 2006/0231981A and WO 2012/062828A, but they are not suitable to manufacture non-straight stringers, because of the steps of the methods and the features of the machines implementing such methods. It would also be impossible to adapt said methods to non-straight stringers, as in such complex manufacturing process, wrinkles may appear, causing the non-validity of the final piece.

In addition, other objects, desirable features and characteristics will become apparent from the subsequent summary and detailed description, and the appended claims, taken in conjunction with the accompanying drawings and this background.

SUMMARY

Various teachings of the present disclosure provide an improved solution for the aforementioned problems, by an apparatus for manufacturing composite stringers, a method to manufacture composite stringers and an aircraft.

In one of various aspects, the various teachings of the present disclosure provide an apparatus for manufacturing composite stringers from a composite laminate comprising: a male mould, a main caul plate, the main caul plate located below the male mould and adapted to hold the composite laminate against the male mould, two fixed female mould halves, located at both sides of the main caul plate, two secondary movable caul plates, each of them located respectively over each one of the two female mould halves and adapted to be lowered from a high position to a low position, and adapted to hold the composite laminate when being in said low position, and retention means, wherein the male mould, the main caul plate, the two female mould halves and the two secondary caul plates are non developable surfaces, and the retention means are adapted to keep each secondary movable caul plate at a predetermined distance of its respective female mould half.

In one embodiment, the retention means are blocks adapted to retain the secondary movable caul plates, creating a predetermined gap always lower than about 2 mm between each secondary caul plate and the composite laminate to allow the free sliding of the composite laminate during the manufacturing process, but preventing said composite laminate from separating from the female mould halves.

In one embodiment, the retention means are secondary caul plates control means adapted to make the secondary caul plates apply a predetermined pressure against the composite laminate.

In one embodiment, the apparatus further comprises male mould control means. In one embodiment, said male mould control means are inter-related with secondary caul plates control means.

In one embodiment, the apparatus further comprises main caul plate control means. In one embodiment, the main caul plate comprise some embossments suitable for retaining the composite laminate between the male mould and the main caul plate preventing the composite laminate from moving in relation to those elements.

In one embodiment, female mould halves comprise heating means suitable for heating the composite laminate within a controlled and registered cycle and thermal insulating materials. In one embodiment, secondary caul plates comprise thermal insulating materials.

In one embodiment, secondary caul plates comprise temperature control means suitable for controlling the composite laminate temperature. In one embodiment, the apparatus further comprises centering means adapted to help the positioning of the composite laminate when the composite laminate is placed on the female mould halves.

In one of various aspects, the various teachings of the present disclosure provide an apparatus for manufacturing composite stringers from a composite laminate comprising: a male mould, a main caul plate, the main caul plate located below the male mould and adapted to hold the composite laminate against the male mould, two receiving mould halves slidable in a direction which is orthogonal to the movement of the male mould, two secondary movable caul plates, each of them located respectively over each one of the two female mould halves and adapted to be lowered from a high position to a low position, and adapted to hold the composite laminate when being in said low position, and retention means, adapted to keep each secondary movable caul plate at a predetermined distance of its respective female mould half.

In one of various aspects, the various teachings of the present disclosure provide a method of manufacturing a composite stringer by means of an apparatus according to either of the above described embodiments.

In one of various aspects, the various teachings of the present disclosure provide an aircraft comprising a composite stringer manufactured by a manufacturing method according to the various teachings of the present disclosure.

In the whole document, "composite skin" refers to an aeronautic piece comprising composite materials, either a laminate composite skin or a sandwich structure comprising a composite material in its covers and/or its core.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
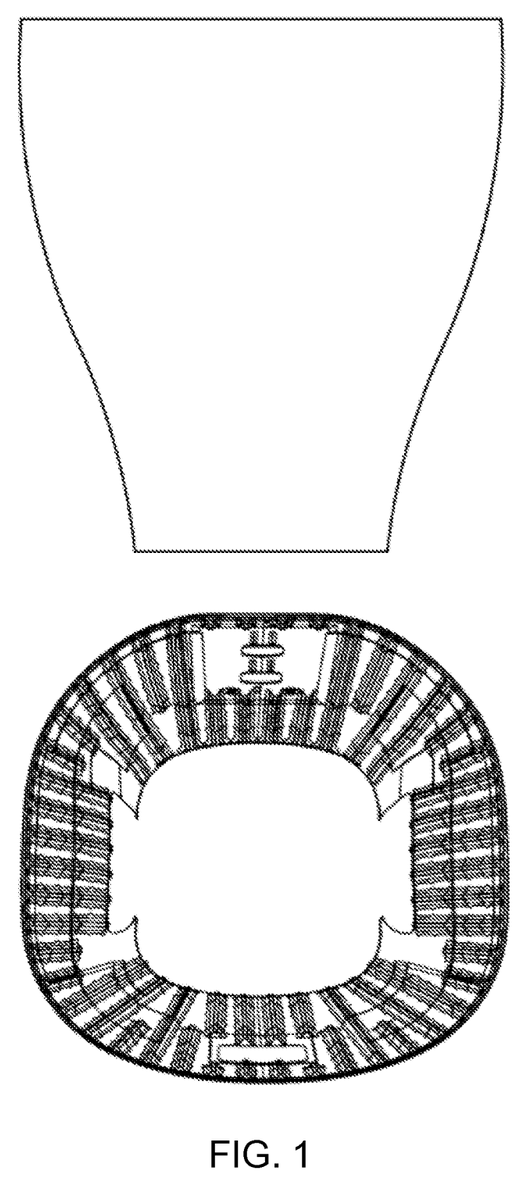
FIG. 1 shows two views of a particular section of an aircraft fuselage where the stringers are to be placed.

FIG. 1 shows two different views of a particular section of an aircraft fuselage, near of the tail end, with its particular contour having a double curvature and thickness variation. This section is built using a skin that provides the shape of the aircraft element and stringers and frames as stiffening elements providing rigidity to this skin. This section has a wide end, i.e., the end with the larger cross section and a narrow end, i.e., the end with the smaller cross section. Further, stringers comply with different mechanical requirements throughout their length, causing them to have their thickness and size changed. Both stringers and frames must fit very accurately to the inner contour of the fuselage section, following its double curvature, its changes of section and thickness and the different stiffness requirements. A stringer that fits this fuselage section has a first end, which is the end that is placed in the wide end of the fuselage section, and a second end, which is the end that is placed in the narrow end of the fuselage section, and its thickness, size and curvature changes from one end to the other.

Figure 2A:
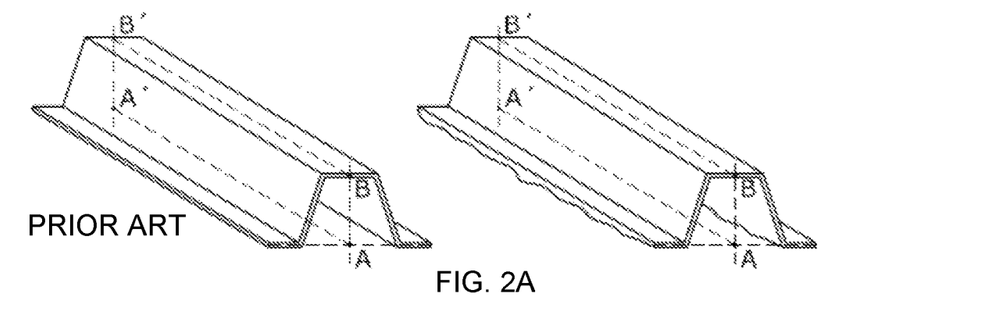
FIGS. 2A-2C shows several geometric features of stringers to be manufactured, compared to a standard straight stringer.
Figure 2B:
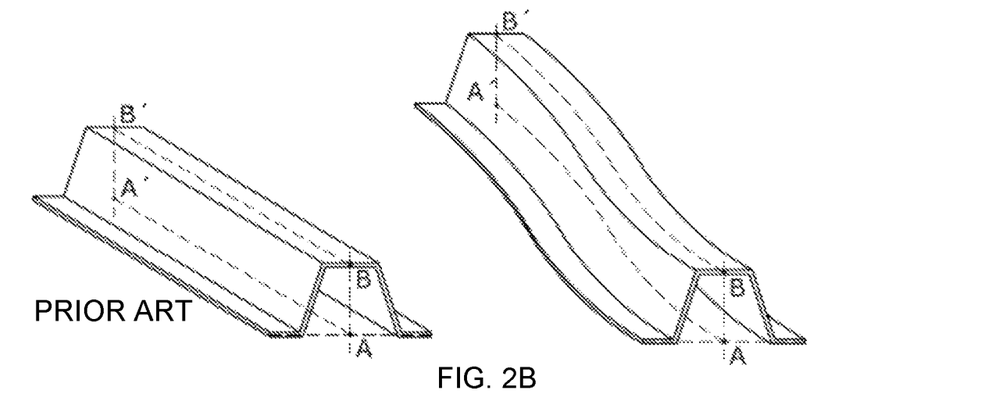
Figure 2C:
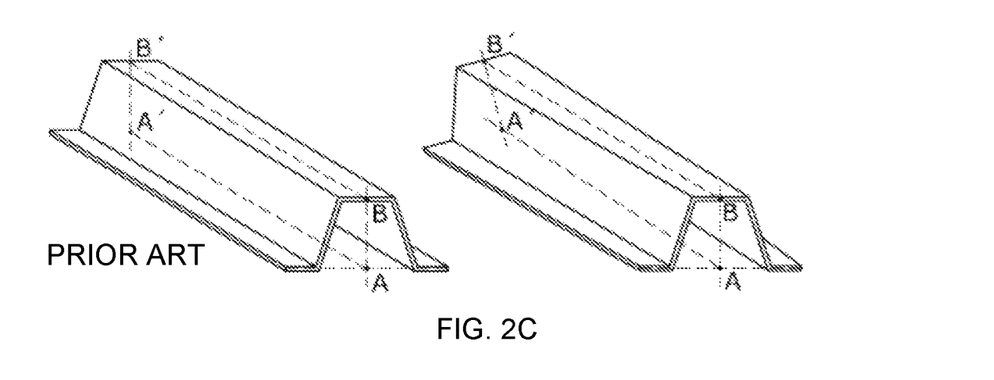

FIGS. 2A, 2B and 2C shows a detailed comparison that helps appreciate the longitudinal geometrical changes performed in the stringers to be manufactured with respect to a conventional straight stringer, which cannot be achieved by the apparatuses comprised in the state of the art. The omega section of the stringer is defined by its head, its two webs and its two feet. To easily monitor the changes carried out in the transverse section of the stringer, two characteristic points have been defined: point A is defined as the middle point of the vertices defined by the intersection of a web and its foot, and point B is defined as the middle point of the vertices of the head of the omega. In one embodiment, the curve defined by points A of all the stringer cross sections and the line defined by points A and B in the first end of the stringer are comprised in the same plane.

In said FIGS. 2A, 2B and 2C, the left stringer in each figure shows a standard straight stringer, with constant cross section. The right stringer in each figure shows a stringer with a particular feature. The stringer to be manufactured combines the three features shown by the right stringers of these FIGS. 2A, 2B, 2C.

FIG. 2A shows an example of two stringers with different geometrical features. The left one shows no change in its thickness during all its length, while the right one shows some changes. In one embodiment, the size of the cross section also changes throughout its length, although this change is not represented in this figure.

FIG. 2B shows another example of two stringers with different geometrical features. The left one shows no change in the longitudinal deflection of the omega section during all its length, while the right one does. In this embodiment, the lines defined by points A and B of every cross cut are contained in the same plane.

FIG. 2C shows another example of two stringers with different geometrical features. The left one shows no torsion during all its length, while the right one does. In this example, the torsion is given to the stringer in such a way that the curve defined by points A of all the stringer cross sections and the line defined by points A and B in the first end of the stringer are comprised in the same plane; while the curve defined by points B of all the stringer cross cuts is not comprised in this plane.

Figure 3:
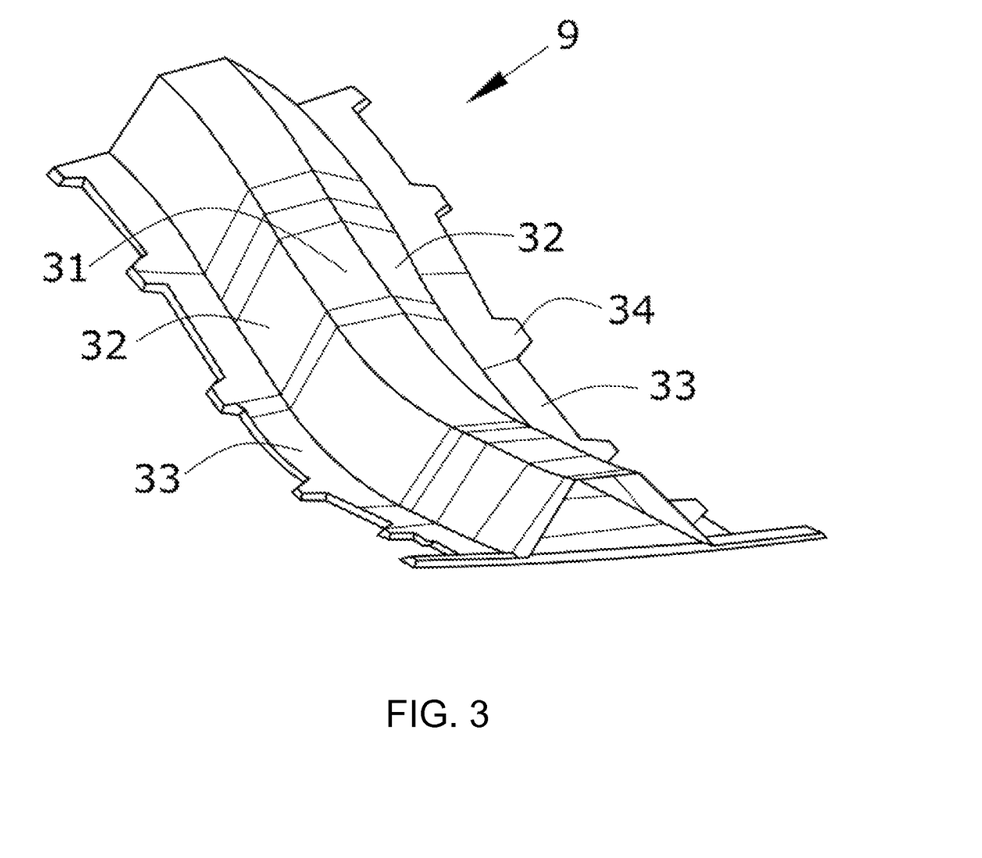
FIG. 3 shows a general view of an example of a stringer which would fit in a section of the fuselage as that shown in FIG. 1.

FIG. 3 shows a general view of an example of a stringer (9) which would fit in a section of the fuselage as that shown in FIG. 1. The omega section of the stringer is defined by its head (31), its two webs (32) and its two feet (33). This stringer (9) has an omega cross section and it presents the three features shown in FIGS. 2A-2C: stringer thickness changes, longitudinal deflection of the omega section changes and torsion changes, as well as some other features, such as festoons (34). Said festoons (34) are widenings in the feet of the omega, that are performed in some parts of its length. These festoons will be taken into account when placing the elements that helps placing the laminate in the correct position before forming it.

Figure 4:
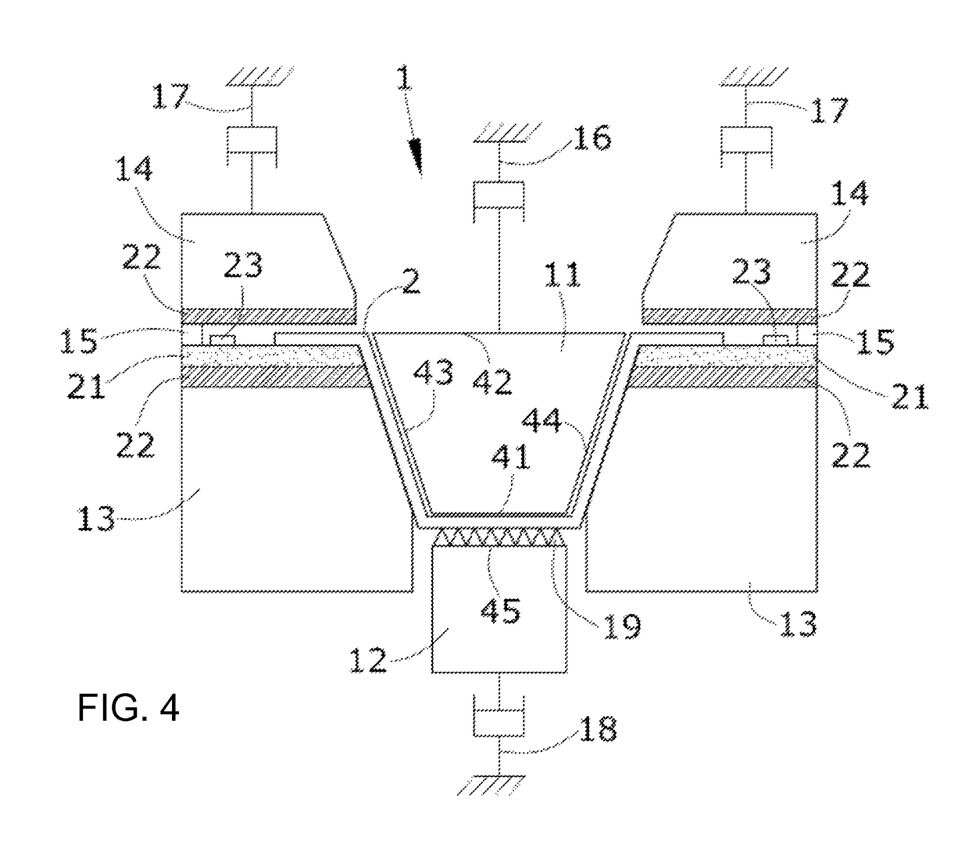
FIG. 4 shows a schematic cross section of an embodiment of an apparatus to form stringers from laminates according to the various teachings of the present disclosure, wherein the retention means are blocks.

FIG. 4 shows a schematic representation of an apparatus (1) to form omega shaped stringers (9) from composite laminates (2) according to the various teachings of the present disclosure. In the embodiment shown in this figure, the apparatus comprises the following elements: a movable male mould (11), a movable main caul plate (12), located below the male mould (11), two fixed female mould halves (13), located at both sides of the main caul plate (12), two secondary movable caul plates (14), each of them located respectively over each one of the two female mould halves (13), and blocks (15).

The male mould (11) has a trapezoidal shape with a head base (41) and a tail base (42). The head base (41) is adapted to form the head of the omega section of the stringer (9), together with the main caul plate (12). In the normal operation of the apparatus, the main caul plate (12) presses the composite laminate (2) against the head base (41) of the male mould (11). The male mould (11) also has two oblique lateral walls (43, 44), which are adapted to form the two webs (32) of the omega section of the stringer (9).

The main caul plate has a front face (45) being opposite to the head base (41) face of the male mould (11), being therefore adapted to hold the composite laminate (2) against the male mould (11). To this extent, it comprises some embossments (19) in said front face (45), adapted to improve the supporting of the composite laminate (2) against the head base (41) face of the male mould (11), preventing the laminate from moving in relation to those elements but without damaging it.

The two fixed female mould halves (13) act as receivers of the male mould (11), helping it form the legs of the omega cross section of the stringer (9). As the male mould (11) is descending, it biases the composite laminate (2) against the female mould halves (13), the walls of which are parallel to the walls of the male mould (11).

The two secondary movable caul plates (14) are adapted to be lowered from a high position to a low position. When they are in the low position, they prevent the composite laminate (2) from separating from the fixed female mould halves (13), together with the blocks (15).

These blocks (15) are adapted to retain the secondary movable caul plates (14), creating a predetermined gap, always lower than about 1.5 mm and lower than about 20% of the dry fabric thickness, between each secondary caul plate (14) and the composite laminate (2) to allow the free sliding of the composite laminate (2) during a manufacturing process, but preventing said composite laminate (2) from separating from the female mould halves (13). This separation would cause the appearance of some wrinkles in the laminate (9) during the forming process, or even causing the malformation of the laminate (9). The position and thickness of these blocks (15) is conditioned by the thickness and shape of the laminate (2), because the thicker of the laminate (2) the thicker the block (15) need to be to maintain the same gap between the secondary caul plate (14) and the laminate (2).

As it can be shown in the figure, the male mould (11), the main caul plate (12), the two female mould halves (13) and the two secondary caul plates (14) are non-developable surfaces. This means that these surfaces are torsioned so that the orientation of an axis defined by any wall of these elements in a cross section is not the same throughout all the length of said element. This is the way to produce torsion in the stringer (9) in the way shown in FIGS. 2C and 3.

Further, the size and position of the blocks (15) and of the secondary caul plates (14) is not the same throughout all the length of the section, as the thickness and size of the laminate (2) varies, and these elements adapt to this variation. Further, the male mould (11), the main caul plate (12), the female mould halves (13) and the secondary caul plates (14) adapt their shapes to follow the changes in the longitudinal deflection and size of the omega section.

The apparatus (1) also comprises control means: male mould control means (16), which are pneumatic actuators that control the pressure applied by the male mould (11) against the composite laminate (2); and main caul plate control means (18), which are in communication with male mould control means (16), and are pneumatic actuators that controls the pressure applied by the main caul plate (12) against the composite laminate (2).

FIG. 4 also presents some heating and insulating means: female mould halves (13) comprise heating means (21) suitable for heating the composite laminate within a controlled and registered cycle and insulating means (22), secondary caul plates (14) also comprise insulating means (22), so that the heat provided by the heating means (21) is not lost by conduction in the contact between the composite laminate (2) and the secondary caul plates (14), and secondary caul plates (14) comprise temperature control means suitable for controlling the composite laminate temperature, which are adapted to send information to the heating means (21).

FIG. 4 also presents centering means (23). These centering means are positioning elements adapted to help the positioning of the composite laminate (2) on the female mould halves (13) when the secondary caul plates (14) are in the high position, before starting the forming process. The position and thickness of these centering means (23) is conditioned by the size of the laminate and the presence of the festoons (34).

Figure 5:
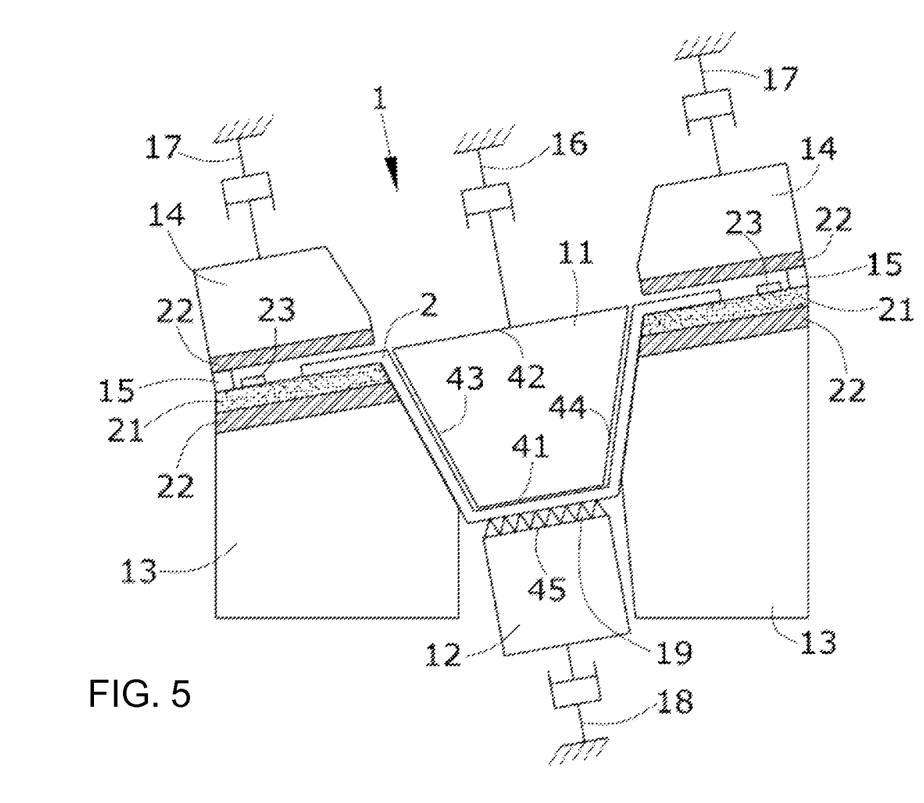
FIG. 5 shows a schematic cross section of the embodiment of the FIG. 4, but in a different section.

FIG. 5 shows a cross section of a different section of the same apparatus (1) of FIG. 4. As it can be seen in this cross section, the male mould (11), the main caul plate (12), the two female mould halves (13) and the two secondary caul plates (14) are twisted with respect to the position shown in FIG. 4, because they are non-developable pieces: they are twisted so that the laminate (2) is twisted in torsion by these surfaces.

Figure 6:
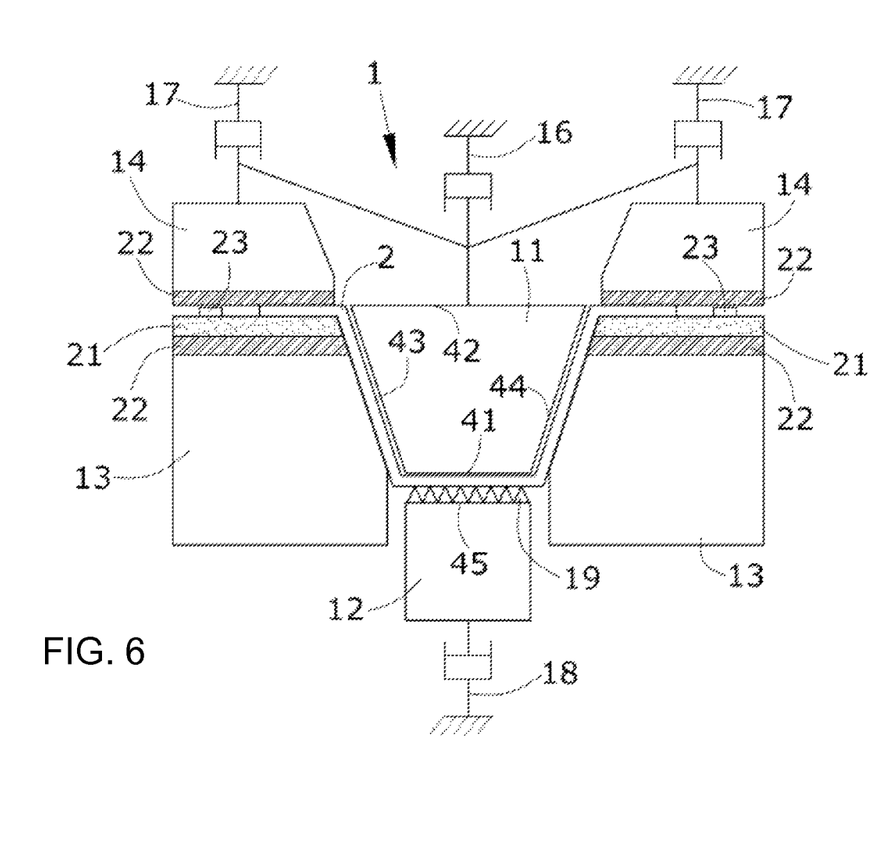
FIG. 6 shows a schematic cross section of an embodiment of an apparatus to form stringers from laminates according to the various teachings of the present disclosure, wherein the retention means are pneumatic actuators.

FIG. 6 shows an embodiment of an apparatus (1) to form stringers (9) from composite laminates (2) according to the various teachings of the present disclosure. This embodiment is similar to that shown in FIGS. 4 and 5, but there is a difference concerning the retention means. In the embodiment shown in FIG. 6, retention means are not blocks (15), but secondary pneumatic actuators (17) adapted to make the secondary caul plates (14) apply a predetermined pressure against the laminate composite (2). These secondary pneumatic actuators (17) are controlled by the pressure control means, therefore providing a controlled pressure to the secondary caul plates (14) so that the pressure applied to the laminate does not exceed a predetermined value, which depends on the stringer to be manufactured.

These secondary pneumatic actuators (17) are in relation with the male mould control means (16), to control the pressure of the secondary caul plates (14) in relation with the pressure applied by the male mould (11).

Figure 7:
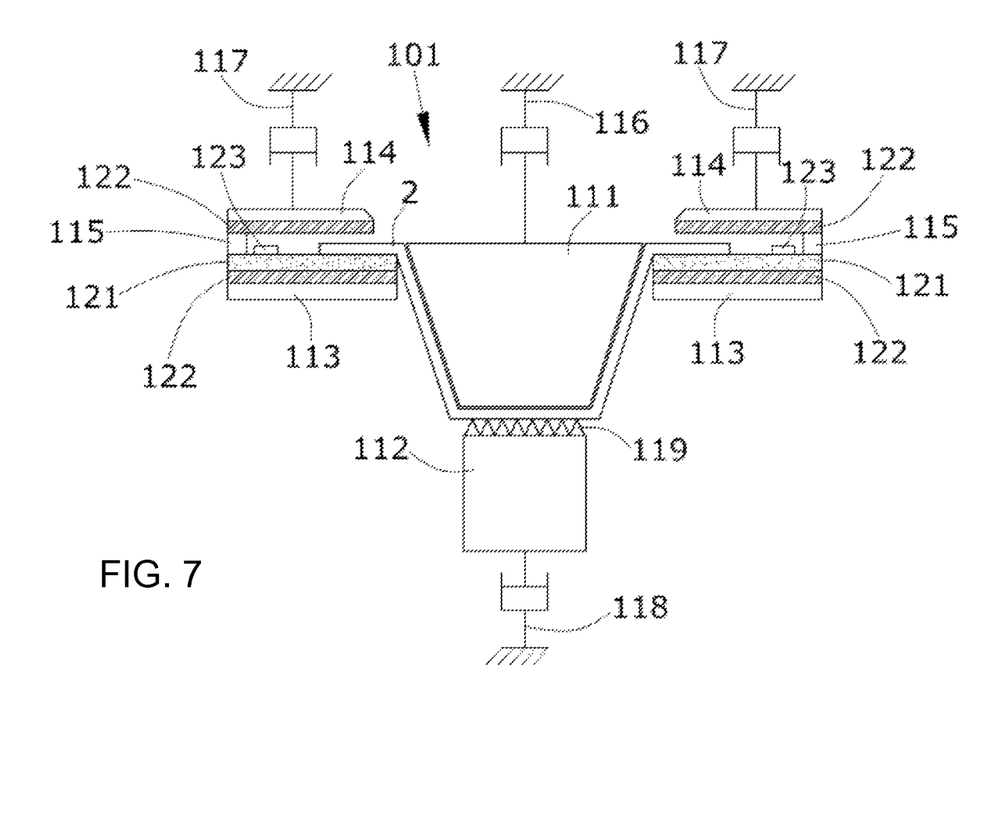
FIG. 7 shows a schematic cross section of an embodiment of an apparatus to form stringers from laminates according to the various teachings of the present disclosure, comprising receiving mould halves instead of female mould halves.

FIG. 7 shows an embodiment of an apparatus for manufacturing composite stringers according to the various teachings of the present disclosure. This apparatus (101) comprises: a male mould (111), a main caul plate (112), two receiving mould halves (113) slidable in a direction which is orthogonal to the movement of the male mould (112), two secondary movable caul plates (114), each of them located respectively over each one of the two receiving mould halves (113) and adapted to hold the composite laminate (2), and blocks (115), adapted to keep each secondary movable caul plate (114) at a predetermined distance of its respective receiving mould half (113).

The main caul plate (112) is located below the male mould (111) and adapted to hold the composite laminate (2) against the male mould (112), the same as the apparatuses shown in FIGS. 4, 5 and 6.

The receiving mould halves (113) are slightly different from the female mould halves (13) of the FIGS. 4, 5 and 6, although they are located substantially in the same position. Its function is to provide bending points for the male mould (111), so that when the male mould (111) descends, the laminate (2) is pressed against the points of the receiving mould halves (113) which are in contact with the laminate (2). As the width of the male mould (111) increases at the same time that it is descending, the receiving mould halves (113) moves away to make room for this operation.

This apparatus (101) also comprises control means: male mould control means (116), which are pneumatic actuators that controls the pressure applied by the male mould (111) against the composite laminate (2), main caul plate control means (118), which are pneumatic actuators that controls the pressure applied by the main caul plate (112) against the composite laminate (2), and secondary pneumatic actuators (17) adapted to make the secondary caul plates (114) apply a predetermined pressure against the laminate composite (2).

FIG. 7 also presents some heating and insulating means: receiving mould halves (113) comprise heating means (121) suitable for heating the composite laminate within a controlled and registered cycle and insulating means (122), secondary caul plates (114) also comprise insulating means (122), so that the heat provided by the heating means (121) is not lost by conduction in the contact between the composite laminate (2) and the secondary caul plates (114), and secondary caul plates (114) comprise temperature control means suitable for controlling the composite laminate temperature, which are adapted to send information to the heating means (121).

This FIG. 7 also presents centering means (123). These centering means are retaining elements adapted to help the positioning of the composite laminate (2) when the secondary caul plates (114) are in the high position, before starting the forming process.

The process of manufacturing a stringer (9) out of a laminate (2) using an apparatus as described in FIGS. 4 to 7 comprises the following stages: once the laminate (2) has been placed in the apparatus, secondary caul plates (14, 114) and the male mould (11, 111) descend simultaneously until a pre-heating position, while the heating means (22, 122) reach the pre-heating temperature; the male mould (11, 111) and the secondary caul plates (14, 114) ascend and the position of the laminate (2) is verified; secondary caul plates (14, 114) descend controlled by the retention means (15, 17), and the male mould (11, 111) descend until it touches the laminate (2), while heating means (21, 121) heat the laminate (2) at a heating temperature; when heating temperature is reached in the laminate (2), the male mould (11, 111) descends causing the movement of the main caul plate (12, 112); and when the male mould (11, 111) has reached its final position, all the elements remain in its position until the laminate (2) reaches a cool temperature.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An apparatus for manufacturing composite stringers from a composite laminate, comprising:
    a male mould,
    a main caul plate, the main caul plate located below the male mould and adapted to hold the composite laminate against the male mould,
    two fixed female mould halves, located at both sides of the main caul plate,
    two secondary movable caul plates, each of the two secondary movable caul plates located respectively over each one of the two female mould halves and adapted to be lowered from a high position to a low position, and adapted to hold the composite laminate when being in said low position, and
    a retention device,
    wherein:
    the male mould, the main caul plate, the two female mould halves and the two secondary caul plates are non developable surfaces, and
    the retention device keeps each secondary movable caul plate at a predetermined distance of its respective female mould half.

2. The apparatus for manufacturing composite stringers according to claim 1, wherein the retention device comprises blocks adapted to retain the secondary movable caul plates, creating a predetermined gap always lower than 2 mm between each secondary caul plate and the composite laminate to allow the free sliding of the composite laminate during the manufacturing process, but preventing said composite laminate from separating from the female mould halves.

3. The apparatus for manufacturing composite stringers according to claim 1, wherein the retention device is a secondary caul plates control device adapted to make the secondary caul plates apply a predetermined pressure against the composite laminate.

4. The apparatus for manufacturing composite stringers according to claim 3 further comprising a male mould control device.

5. The apparatus for manufacturing composite stringers according to claim 4 wherein the male mould control device is inter-related with the secondary caul plates control device.

6. The apparatus for manufacturing composite stringers according to claim 1 further comprising a main caul plate control device.

7. The apparatus for manufacturing composite stringers according to claim 1, wherein the main caul plate comprise one or more embossments suitable for retaining the composite laminate between the male mould and the main caul plate preventing the composite laminate from moving in relation to those elements.

8. The apparatus for manufacturing composite stringers according to claim 1, wherein the female mould halves comprise a heating device suitable for heating the composite laminate within a controlled and registered cycle and thermal insulating materials.

9. The apparatus for manufacturing composite stringers according to claim 1, wherein the two secondary movable caul plates comprise thermal insulating materials.

10. The apparatus for manufacturing composite stringers according to claim 1 wherein the two secondary movable caul plates comprise a temperature control device suitable for controlling the composite laminate temperature.

11. The apparatus for manufacturing composite stringers according to claim 1, further comprising a centering device adapted to help the positioning of the composite laminate when the composite laminate is placed on the female mould halves.

12. An apparatus for manufacturing composite stringers from a composite laminate, comprising:
    a male mould,
    a main caul plate, the main caul plate located below the male mould and adapted to hold the composite laminate against the male mould,
    two receiving mould halves slidable in a direction which is orthogonal to the movement of the male mould, two secondary movable caul plates, each of the two secondary movable caul plates located respectively over each one of the two receiving mould halves and adapted to be lowered from a high position to a low position, and adapted to hold the composite laminate when being in said low position, and a retention device to keep each secondary movable caul plate at a predetermined distance of its respective receiving mould half, wherein the male mould, the main caul plate, the two receiving mould halves, and the two secondary movable caul plates are non-developable surfaces.

13. An apparatus for manufacturing composite stringers from a composite laminate, comprising:

a male mould, a main caul plate, the main caul plate located below the male mould and adapted to hold the composite laminate against the male mould, two fixed female mould halves, located at both sides of the main caul plate, two secondary movable caul plates, each of the two secondary movable caul plates located respectively over each one of the two female mould halves and adapted to be lowered from a high position to a low position, and adapted to hold the composite laminate when being in said low position, and at least one retention device, a centering device adapted to help the positioning of the composite laminate when the composite laminate is placed on the female mould halves, wherein:

the male mould, the main caul plate, the two female mould halves and the two secondary caul plates are non developable surfaces, and the retention device keeps each secondary movable caul plate at a predetermined distance of its respective female mould half.

14. The apparatus for manufacturing composite stringers according to claim 13, wherein the retention device comprises blocks adapted to retain the secondary movable caul plates, creating a predetermined gap always lower than 2 mm between each secondary caul plate and the composite laminate to allow the free sliding of the composite laminate during the manufacturing process, but preventing said composite laminate from separating from the female mould halves.

15. The apparatus for manufacturing composite stringers according to claim 13, wherein the retention device is a secondary caul plates control device adapted to make the secondary caul plates apply a predetermined pressure against the composite laminate.

16. The apparatus for manufacturing composite stringers according to claim 13, wherein the main caul plate comprise one or more embossments suitable for retaining the composite laminate between the male mould and the main caul plate preventing the composite laminate from moving in relation to those elements.

17. The apparatus for manufacturing composite stringers according to claim 13, wherein the female mould halves comprise a heating device suitable for heating the composite laminate within a controlled and registered cycle and thermal insulating materials.

18. The apparatus for manufacturing composite stringers according to claim 13, wherein the two secondary movable caul plates comprise thermal insulating materials.

19. The apparatus for manufacturing composite stringers according to claim 13, wherein the two secondary movable caul plates comprise a temperature control device suitable for controlling the composite laminate temperature.

* * * * *